United States Patent Office 2,837,562
Patented June 3, 1958

2,837,562
SYNTHETIC LUBRICATING OIL COMPOSITIONS

Alfred H. Matuszak, Westfield, Harold R. Ready, Roselle Park, and William E. Lifson, Union, N. J., assignors to Esso Research and Engineering Company, a corporation of Delaware No Drawing. Application January 4, 1955
Serial No. 479,868

1 Claim. (Cl. 260—485)

This invention relates to lubricating oil compositions and more particularly to synthetic lubricating oil compositions containing esters of dibasic acids. Still more particularly, the invention relates to esters of mixtures of dibasic acids, which ester mixtures are useful as synthetic lubricants having excellent low temperature performance.

In the lubricant art, considerable progress has been realized in recent years in the production of lubricants. Recently, in an effort to obtain superior lubricants endowed with specific and superior characteristics, a new field has been explored, namely the synthesis of lubricants from various materials. Esters represent one class of materials which have attracted unusual interests as synthetic lubricants. In general, they are characterized by higher viscosity indices, lower volatility and lower pour points than mineral oils of corresponding viscosity. Lubricants possessing such properties are of special value in the lubrication of engines which are subjected to high temperatures such as combustion turbine engines, particularly those of the "prop-jet" type. Mineral oil lubricants containing added viscosity index improvers, thickeners or other highly non-volatile additives are undesirable for use in such engines because of the tendency to leave a residue which accumulates and interferes with the operation of the engine. Particularly desirable esters, including diesters and complex esters, which are useful as synthetic lubricants, have been prepared heretofore utilizing sebacic acid as one of the reactants in the esterification reaction. Complex esters of this type are described, for example, in U. S. Patents No. 2,575,195 and No. 2,575,196.

It has now been found that esters having improved lubricating properties may be prepared from a mixture of $C_{10}$ dibasic acids. The new esters of this invention are superior in certain aspects to esters prepared from a single dibasic acid component, such as sebacic acid. More particularly, it has been found that esters prepared by esterifying a mixture of $C_{10}$ dibasic acids comprising a major proportion of α-ethyl suberic acid have superior low temperature properties, especially pour points. The new ester compositions of this invention are suitable for use as plasticizers and the like and particularly as synthetic lubricants.

The novel ester compositions of this invention which have lubricating properties have the sum formula

A—X—B where

A represents residues selected from the group consisting of (1) Alcohol radical —[—X—glycol radical—]$_y$—
(2) Monobasic acid radical-glycol radical —[—X—glycol radical]$_z$—

B represents residues selected from the group consisting of (1) Alcohol radical
(2) Glycol radical-monobasic acid radical X represents residues of a mixture of $C_{10}$ dibasic acids comprising a major proportion of α-ethyl suberic acid; and $y$ and $z$ are numbers of 0 to 6

A particularly preferred mixture of $C_{10}$ dibasic acids comprises about 60 to 90% by weight of α-ethyl suberic acid, about 5 to 25% by weight of α,α'-diethyl adipic acid and about 5 to 15% by weight of sebacic acid. These mixtures of $C_{10}$ dibasic acids may be utilized to prepare diesters (i. e. alcohol radical—X—alcohol radical) as well as complex esters in accordance with this invention.

Diester compositions of this invention which have lubricating properties have the sum formula

A—X—B where A and B represent residues of monohydric alcohols and X represents residues of the mixture of $C_{10}$ dibasic acids.

The following five general types of complex esters may be prepared in accordance with this invention by employing mixtures of $C_{10}$ dibasic acids:

*Type I.*—Monobasic acid-glycol-(dibasic acid-glycol)$_n$-monobasic acid

This complex ester may be represented by the following structural formula:

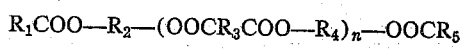

wherein $R_1$ and $R_5$ are the alkyl radicals of the monobasic acids, $R_2$ and $R_4$ are the alkyl radicals from the glycols, $R_3$ is the alkyl radical of the mixture of $C_{10}$ dibasic acids, and $n$ is an integer of 1 to 6.

The esters of this type may be prepared by admixing the calculated amounts of the various compounds and carrying out a straightforward esterification reaction. The reaction conditions are continued with an occasional sample of the product being tested for acidity until a desired minimum acidity is attained.

*Type II.*—Alcohol-dibasic acid-(glycol-dibasic acid)$_n$-alcohol

This material may be represented by the following formula:

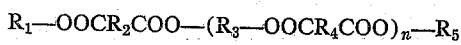

wherein $R_1$ and $R_5$ are the combining radicals of the alcohol, $R_2$ and $R_4$ are the alkyl radicals of the $C_{10}$ dibasic acid mixture, $R_3$ is the alkyl radical of the glycol, and $n$ is an integer of 1 to 6.

These esters are prepared in the manner similar to those of Type I.

*Type III.*—Alcohol-(dibasic acid-glycol)$_n$-monobasic acid

These esters are prepared by reacting the $C_{10}$ dibasic acid mixture and glycol under such conditions that one hydroxyl group of the glycol combines with one carboxyl group of the dibasic acid; in other words, a half ester is formed. This half ester is then reacted with a molar proportion each of an aliphatic alcohol and a monobasic acid. These materials may be said to have the general formula:

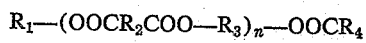

wherein $R_1$ is the combining radical of the aliphatic alcohol, $R_2$ the alkyl radical of the $C_{10}$ dibasic acid mixture, $R_3$ the alkyl radical of the glycol, $R_4$ the alkyl radical of the monobasic acid, and $n$ is an integer of 1 to 6.

The preparation of these ester materials is specifically set out in U. S. Patent No. 2,575,195.

*Type IV.—Alcohol-dibasic acid-(glycol-dibasic acid)$_n$-alcohol*

These materials may be said to have the general formula:

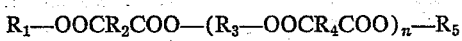
$$R_1\text{—OOCR}_2\text{COO—}(R_3\text{—OOCR}_4\text{COO})_n\text{—}R_5$$

wherein $R_1$ and $R_5$ are the combining alkyl radicals of the alcohol, $R_2$ and $R_4$ the alkyl radicals of the $C_{10}$ dibasic acid mixture, $R_3$ is the alkyl radical of the glycol, and $n$ is an integer of 1 to 6.

It will be noted that the esters of Type IV have the same structural formula as Type II. However, these complex esters are prepared by reacting an alcohol with the $C_{10}$ dibasic acid mixture under such conditions that a half ester is formed and reacting two moles of such ester with one mole of a glycol. The preparation of this type of synthetic ester lubricating oil is set out in detail in co-pending application Serial No. 52,429, now Patent No. 2,703,811 which has been reissued to Reissue No. 24,287:

*Type V.—Monobasic acid-glycol-(dibasic acid-glycol)$_n$-monobasic acid*

These synthetic esters may be said to have the general formula:

$$R_1\text{COO—}R_2\text{—}(\text{OOCR}_3\text{COO—}R_4)_n\text{—OOCR}_5$$

wherein $R_1$ and $R_5$ are the alkyl radicals of the monobasic acid, $R_2$ and $R_4$ are the alkyl radicals of the glycol, $R_3$ is the alkyl radical of the $C_{10}$ dibasic acid mixture, and $n$ is an integer of 1 to 6.

It will be noted that these synthetic esters are the same as those appearing above under Type I except that this type is prepared by reacting a monobasic acid with a glycol under such conditions that a half ester is formed and reacting two moles of such ester with one mole of the $C_{10}$ dibasic acid mixture. The details of the preparation of this type of synthetic ester are set out in U. S. Patent No. 2,575,196.

As was set out above, these complex ester materials are prepared by combining alcohols, monobasic acids, $C_{10}$ dibasic acid mixtures, and glycols in various fashions. In preparing such complex ester compositions, mixtures of different molecular weight complex esters are generally formed along with a minor portion of simple ester. Thus more specifically esters having $y$ and $z$ integers (in the aforementioned general formula) varying from 0 to about 6 may be formed.

Monohydric alcohols containing 1 to 20 carbon atoms may be utilized to prepare the complex ester compositions of this invention. Preferably, the monohydric alcohols are aliphatic primary alcohols containing no oxygen or sulfur atoms and having from about 6 to 10 carbon atoms per molecule. The monohydric alcohols which may be employed are typified by the following:

Methyl alcohol
Ethyl alcohol
n-Butyl alcohol
2-ethylbutyl alcohol
N-hexyl alcohol
n-Octyl alcohol
2-ethylhexyl alcohol
Cetyl alcohol
Oleyl alcohol
Ethylene glycol mono-n-butyl ether
Ethylene glycol mono-2-ethylbutyl ether
Ethylene glycol mono-2-ethylhexyl ether
Ethylene glycol mono-tert.-octyl ether
β-n-Butylmercaptoethanol
β-Tert.-octylmercaptoethanol
β-n-Dodecylmercaptoethanol
Diethylene glycol mono-n-butyl ether
Diethylene glycol mono-2-ethylbutyl ether
Diethylene glycol mono-2-ethylhexyl ether
Propylene glycol mono-butyl thioether
Propylene glycol mono-tert.-octyl thioether
Propylene glycol mono-n-dodecyl thioether
n-Butylmercaptoethoxyethanol
Tert.-octylmercaptoethoxyethanol
n-Dodecylmercaptoethoxyethanol
n-Butylmercaptopropoxypropanol
Tert.-octylmercaptopropoxypropanol
n-Dodecylmercaptopropoxypropanol
Propylene glycol mono-n-butyl ether
Dipropylene glycol monomethyl ether
Dipropylene glycol monoethyl ether
Dipropylene glycol mono-n-butyl ether
Tripropylene glycol monomethyl ether
Tripropylene glycol monoethyl ether
Tripropylene glycol mono-n-butyl ether
Propylene glycol monoisopropyl ether
Dipropylene glycol monoisopropyl ether
Tripropylene glycol monoisopropyl ether Many of the above listed ether alcohols, formed by the reaction of ethylene oxide or propylene oxide with aliphatic alcohols, are known in the industry as "Dowanols," "Carbitols," or "Cellosolves."

A group of alcohols especially adapted for use in connection with the present invention are the so-called "Oxo" alcohols, prepared by the well-known Oxo synthesis. This process involves the catalytic reaction of olefins with carbon monoxide and hydrogen at elevated temperatures of about 300° to 400° F. and pressures of about 2500 to 4000 p. s. i. g. to form, particularly in the presence of cobalt catalysts, aldehydes having one carbon atom more than the olefin originally used. The aldehyde is catalytically hydrogenated to the corresponding alcohol which is recovered as an overhead product by distillation of the reaction mixture. The distillation residue, i. e., the so-called "Oxo-bottoms," is rich in by-product alcohols of higher molecular weight. This residue may also be employed.

While the exact composition of all these alcohols is not known, it is well established that they are mixtures of primary alcohols, at least a substantial proportion of which is of the branched-chain type. The overhead alcohol product consists of a mixture of such alcohols averaging 1 carbon atom more than the olefin originally fed to the "Oxo" synthesis. Oxo alcohols containing in the range of about 6 to 10 carbon atoms are especially preferred for the purposes of the present invention.

Esters having excellent properties for the purposes of this invention may be prepared from Oxo alcohols produced by reacting polymers and copolymers of $C_3$ and $C_4$ monoolefins in the presence of oxonation catalysts as described above. Suitable mixtures of these monoolefins are readily available in refinery gases, and processes for their conversion into liquid copolymers are well known in the art. In accordance with the most widely used of these processes, the olefins are contacted in liquid phase with a polymerization catalyst comprising phosphoric acid supported on kieselguhr. Other similar processes use as catalyst silica gel impregnated with phosphoric acid, or sulfuric acid, Friedel-Crafts catalysts, activated clays, and others. Polymerization conditions in the presence of phosphoric acid catalysts include temperatures of about 300° to 500° F. and pressures of about 250 to 5,000 p. s. i. g. The olefinic feed stocks normally contain about 15 to 60 mol percent of propylene, about 0.5 to 50 mol percent of butylenes and from 0.1 to 10 mol percent of isobutylene, the remainder being saturated hydrocarbons having 2 to 4 carbon atoms per molecule. In place of, or together with, these olefin mixtures the dimer and trimer of isobutylene as well as tri, tetra and penta propylene may be used.

The composition and structure of $C_8$ Oxo alcohols obtained from a mixture of $C_7$ olefins of the type described above and more specifically of $C_7$ olefins derived from a refinery gas stream containing propylene and mixed normal and isobutylenes are shown below:

| Structure of C₈ Oxo alcohols prepared from C₃-C₄ copolymer heptenes | Percent |
|---|---|
| C—C—C—C—C—C—OH (with two C branches) | 29 |
| C—C—C—C—C—C—O—H (with two C branches) | 25 |
| C—C—C—C—C—C—OH (with two C branches) | 17 |
| C—C—C—C—C—C—C—O—H (with one C branch) and C—C—C—C—C—C—OH (with one C branch) | 16 |
| C—C—C—C—C—C—O—H (with two C branches) | 2.3 |
| C—C—C—C—C—C—OH (with branches) | 1.4 |
| 2-alkyl-alkanols | 4.3 |
| others | 5.0 |
| | 100.0 |

Other Oxo alcohols are believed to have compositions generally analogous to that specified above, the chain lengths and degree of branching depending on the type of olefins used. For example, the Oxo alcohols derived from tripropylene are believed to be predominantly a mixture of various isomeric trimethyl heptanols. It is noted that even when pure straight-chain olefins are used as the starting materials the alcohols obtained consist predominantly of branched-chain compounds.

The glycols employed in preparing the esters of the present invention include ethylene glycol and any of the paraffinic homologues of the same containing up to 18 carbon atoms. These may include, for example, ethylene glycol, propylene glycol, butylene glycols, pinacone, trimethylene glycol, tetramethylene glycol, pentamethylene glycol, and the like. Since the glycols may also contain oxygen or sulfur atoms, compounds such as diethylene glycol, triethylene glycol, the polyethylene glycols of the formula $$HO(CH_2CH_2O)_nCH_2CH_2OH$$

where $n$ is 1 to 26, and the polypropylene glycols of the general formula $$HO(\overset{R_1}{\underset{}{C}H}-\overset{R_2}{\underset{}{C}HO})_n\overset{R_1}{\underset{}{C}H}-\overset{R_2}{\underset{}{C}HOH}$$

where either $R_1$ or $R_2$ is a methyl group and the other is hydrogen, and where $n$ is 1 to 20, may likewise be employed. Glycols containing sulfur atoms in thioether linkages may also be employed, and these include such compounds as thiodiglycol and 1,2-bis(2-hydroxyethylmercapto)ethane. There also may be used glycols containing both oxygen and sulfur in similar linkages; such a compound is bis-(2-(2-hydroxyethoxy) ethyl) sulfide.

The monobasic carboxylic acids useful in the present invention are preferably aliphatic and saturated and may contain about 1 to 22 carbon atoms and preferably contain about 2 to 10 carbon atoms per molecule. Among the monobasic acids which may be employed in the preparation of the esters of the present invention, the following may be listed as illustrative:

Acetic acid
Propionic acid
Butyric acid
Valeric acid
Caproic acid
Caprylic acid
Pelargonic acid
Capric acid
Lauric acid
Palmitic acid
Stearic acid
Oleic acid
β-Methoxypropionic acid
β-Ethoxypropionic acid
β-Tert.-octoxypropionic acid
β-Ethylmercaptopropionic acid
β-Tert.-octylmercaptopropionic acid
β-Tert.-dodecylmercaptopropionic acid The esters of this invention are prepared from a mixture of $C_{10}$ dibasic acids comprising a major proportion of α-ethyl suberic acid. A preferred mixture of $C_{10}$ dibasic acids comprises about 60 to 90% by weight of α-ethyl suberic acid, about 5 to 25% by weight of α,α'-diethyl adipic acid and about 5 to 15% by weight of sebacic acid. It will be understood that ester compositions of this invention may be prepared by separately forming individual esters using a single $C_{10}$ dibasic acid and then subsequently combining these esters to form ester mixtures in accordance with this invention. However, in the preferred form of the present invention a mixture of these $C_{10}$ dibasic acids is esterified since such mixtures of $C_{10}$ dibasic acids may be relatively inexpensively prepared. For example, butadiene obtained from petroleum may be polymerized to a dimer mixture which may then be converted to mixtures of $C_{10}$ dibasic acids by reaction of the butadiene dimer mixture with HCN followed by hydrolysis, or by reaction with HCl and NaCN followed by hydrolysis or by the oxonation of the dimer diolefin followed by oxidation to the acid mixture.

The molecular weight of the ester molecules of the invention preferably should be at least about 300 and the viscosity at 210° F. preferably should not be greater than about 15 centistokes to provide a product having good lubricating properties. Generally, the esters of this invention will contain in the range of about 20 to 130 carbon atoms per molecule and preferably contain about 24 to 100 carbon atoms per molecule. The average molecular weight of the complex esters preferably is in the range of about 300 to 1200. In addition to being useful as synthetic lubricants, the esters of this invention are useful as plasticizers, components of plasticizers, and the like. The esters are particularly useful in synthetic lubricating compositions because of their excellent low temperature performance. Generally it is desired that ester compositions which are utilized in synthetic lubricant blends for jet aircraft have the following ranges of properties:

ASTM flash point _____ 400° to 550° F.
ASTM pour point _____ Below: —35° to —75° F.
Kinematic vis./210° F ____ 3 to 11 cs.

The esters of this invention may be employed in lubricating oil compositions containing other lubricating oil base stocks such as mineral lubricating oils or other synthetic lubricating oils. The mineral lubricating oils which may be employed include straight mineral lubricating oils or distillates derived from paraffinic, naphthenic, asphaltic or mixed base crudes, or if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced, for example, by solvent extraction with solvents of the type of phenol, sulfur dioxide, furfural, dichloroethyl ether, nitrobenzene, crotonaldehyde, etc. Preferably, the mineral lubricating oil base stocks have been dewaxed by any of the well-known dewaxing methods such as solvent (propane, methyl ethyl ketone, etc.) dewaxing or by utilizing plate and frame presses with chilling. The mineral lubricating oils generally have viscosities in the range of about 40 to 150 seconds Saybolt at 210° F.

Also other synthetic lubricating oils having a viscosity of at least 30 SSU at 100° F. may be used in admixture with the esters of the present invention. Examples of these other synthetic lubricating oils include esters of monobasic acids (e. g. ester of $C_8$ Oxo alcohol with $C_8$ Oxo acid, ester of $C_{13}$ Oxo alcohol with octanoic acid, etc.), esters of dibasic acids (e. g. di-nonyl adipate, etc.), esters of glycols (e. g. $C_{13}$ Oxo acid diester of tetraethylene glycol, etc.), complex esters (e. g. the complex ester formed by reacting one mole of sebacic acid with two moles of tetraethylene glycol and two moles of 2-ethylhexanoic acid; the complex ester formed by reacting one mole of tetraethylene glycol with two moles of sebacic acid and two moles of 2-ethylhexanol; the complex ester formed by reacting together one mole of azelaic acid, one mole of tetraethylene glycol, one mole of $C_8$ Oxo alcohol, and one mole of $C_8$ Oxo acid), esters of phosphoric acid (e. g. the ester formed by contacting three moles of the mono methyl ether of ethylene glycol with one mole of phosphorus oxychloride, etc.), halocarbon oils (e. g. the polymer of chlorotrifluoroethylene containing twelve recurring units of chlorotrifluoroethylene), alkyl silicates (e. g. tetra-2-ethylhexyl silicate, hexa-$C_8$ Oxo disiloxane), silicones (e. g. methyl polysiloxanes, ethyl polysiloxanes, methyl-phenyl polysiloxanes, ethyl-phenyl polysiloxanes, etc.), sulfite esters (e. g. ester formed by reacting one mole of sulfur oxychloride with two moles of the methyl ether of ethylene glycol, etc.), carbonates (e. g. the carbonate formed by reacting $C_8$ Oxo alcohol with ethyl carbonate to form a half ester and reacting this half ester with tetraethylene glycol), mercaptals (e. g. the mercaptal formed by reacting 2-ethyl hexyl mercaptan with formaldehyde), formals (e. g. the formal formed by reacting $C_{13}$ Oxo alcohol with formaldehyde or the formal formed by reacting 2 moles $C_{13}$ Oxo alcohol with two moles formaldehyde to form a hemiformal which is then reacted with one mole tripropylene glycol), polyglycol type synthetic oils (e. g. the compound formed by condensing butyl alcohol with fourteen units of propylene oxide, etc.), or mixtures of any of the above in any proportions. In general, the esters of this invention may be utilized in lubricating oil compositions in proportions in the range of about 5 to 100% by volume based on the total lubricating oil base stock employed in the lubricating oil compositions.

Also it may be desirable in many instances to employ mixtures of the diesters and the complex esters prepared in accordance with this invention to thereby obtain the advantages of each of these two types of esters in a single lubricating oil blend. It will be understood in this connection that in general there is a significant difference between the properties and characteristics of diesters and complex esters. Thus a number of different blends of these two types of esters may be prepared to provide a series of lubricant base stocks which have different volatilities, pour points, viscosity indices, and the like, to thereby provide suitable "tailor-made" lubricants for different lubricating conditions, e. g. different temperature, different pressure, different application, etc.

The lubricating oil compositions of this invention (which comprise a major proportion of a lubricating oil) may also include minor proportions of conventional additives such as V. I. improvers or thickeners, e. g. polymethacrylates, polyacrylates; extreme pressure agents, e. g. dialkyl acid phosphites; oxidation inhibitors, e. g. phenothiazine; rust inhibitors, e. g. calcium sulfonate, lecithin, Span 80; anti-wear agents, e. g. tricresyl phosphate; and the like, to obtain desired results. The ester compositions of this invention may also be employed as the lubricating oil component or one of the components of grease compositions, in which composition they may be thickened to a grease consistency with conventional thickeners such as soaps, salts, soap-salt complexes, and the like.

The invention will be more fully understood by reference to the following examples. It is pointed out, however, that the examples are given for the purpose of illustration only and are not to be construed as limiting the scope of the present invention in any way.

EXAMPLE I

A. PREPARATION OF CONVENTIONAL DIESTER

A diester of a $C_7$ Oxo alcohol and sebacic acid was prepared. The $C_7$ Oxo alcohol was obtained by oxonation of a $C_6$ olefin fraction obtained by fractionating a propylene-butylene polymer produced by phosphoric acid polymerization. The $C_7$ Oxo alcohol sebacic acid diester was prepared by heating stoichiometric amounts of the necessary ingredients plus 10% excess $C_7$ Oxo alcohol, 0.5% $NaHSO_4$ catalyst and 10% heptane water entrainer to a maximum esterification temperature of 210–220° C. until all of the water of esterification had been removed or collected in a water trap. The crude ester was then decanted from the catalyst, diluted with a half volume of heptane and washed with dilute sodium carbonate solution before finally stripping to about 200° C. at 8–10 mm.

B. PREPARATION OF DIESTER OF THIS INVENTION

A diester of $C_7$ Oxo alcohol and a mixture of $C_{10}$ dibasic acids was prepared. The $C_7$ Oxo alcohol was the same as that employed in part A of this example. The mixture of $C_{10}$ dibasic acids consisted essentially of the following:

| Dibasic acid: | Weight, percent |
|---|---|
| α-ethyl suberic | 75 |
| α,α'-Diethyl adipic | 15 |
| Sebacic | 10 |

The diester of $C_7$ Oxo alcohol and the mixture of $C_{10}$ dibasic acids was prepared in the manner described above for $C_7$ Oxo sebacate.

C. PROPERTIES OF THE DIESTERS

The diesters prepared as above had the following properties:

| | Conventional Diester (Part A) | Diester of this Invention (Part B) |
|---|---|---|
| Kin. Vis.: | | |
| 210° F., Cs | 3.2 | 2.93 |
| 100° F | 11.3 | 11.31 |
| −40° F | Solid | 1511 |
| −65° F | Solid | 9186 |
| Pour Point, ° F | −35 | <−75 |

Generally it is desirable that synthetic lubricating oil compositions used for jet aircraft have a pour point below about −65° F. For this reason, it is essential that lubricating oil base stocks used in such compositions also have pour points below about −65° F. It will be noted that the conventional diester $C_7$ Oxo sebacate had a pour point of only −35° F. and was solid at temperatures below −40° F. On the other hand, the diester of this invention was a very mobile liquid at −65° F. and had a pour point below −75° F.

EXAMPLE II

A. PREPARATION OF CONVENTIONAL COMPLEX ESTER

A glycol centered complex ester of 2-ethylhexanol, sebacic acid and thiodiglycol was prepared in the following manner: Stoichiometric amounts of each ingredient (i. e. 2 moles of the alcohol and 2 moles of the acid per mole of the glycol) plus 20% excess alcohol, 0.5%

NaHSO$_4$ catalyst and 10% heptane were heated to 210° C. until no more water of reaction was formed. The crude ester was then heat treated for 3 hours at 230–240° C. at 10 mm. pressure. The material was then decanted from the catalyst, washed with 10% Na$_2$CO$_3$, washed with heptane-isopropanol-water mixture and then stripped to 160° C. at 10 mm.

B. PREPARATION OF COMPLEX ESTER OF THIS INVENTION

A complex ester of C$_8$ Oxo alcohol, a mixture of C$_{10}$ dibasic acids and thiodiglycol was prepared. The C$_8$ Oxo alcohol was prepared by oxonation of a C$_7$ propylene-butylene polymer followed by hydrogenation. The heart cut from this process constitutes the C$_8$ Oxo alcohol and has been described more fully heretofore in this specification. The mixture of C$_{10}$ dibasic acids was the same as that used in Example I, part B. The complex ester was prepared in the same manner as described in Example II, part A.

C. PROPERTIES OF THE COMPLEX ESTERS

The complex esters prepared as described above had the following properties:

|  | Conventional Complex Ester (Part A) | Complex Ester of this Invention (Part B) |
|---|---|---|
| Kin. Vis.: |  |  |
| 210° F., Cs | 6.92 | 6.60 |
| 100° F | 33.3 | 36.2 |
| −40° F | Solid | 18570 |
| Pour Point, °F | +55 | <−75 |
| D-664 Neut. No | 0.19 | 0.29 |
| Hydroxyl No | 0.7 | 1.0 |
| Sulfur, percent | 3.79 | 4.25 |

It will be noted that the conventional complex ester had a pour point of +55° F. and was solid at a temperature of −40° F. On the other hand, the complex ester of this invention had a pour point below −75° F. and was a liquid at −40° F. In addition, the complex ester described above which was prepared in accordance with this invention has an excellent load-carrying ability making it additionally useful as a jet engine lubricant.

EXAMPLE III

A complex ester of C$_8$ Oxo alcohol, a mixture of C$_{10}$ dibasic acids and tetraethylene glycol was prepared. The C$_8$ Oxo alcohol was the same as that described in Example II, part B, and the mixture of C$_{10}$ dibasic acids was the same as that described in Example I, part B. The complex ester of this example was prepared in the same manner as described in Example II. The complex ester prepared above had the following properties:

Properties:
  Kin. vis.—
    210° F., cs _____ 8.85
    100° F _____ 49.9
    0° F _____ 2140
    −40° F _____ 40,200
  Pour point, °F _____ −60

It will be noted that the complex ester described above has properties making it useful as a synthetic lubricating oil base stock for synthetic lubricating oil compositions.

EXAMPLE IV

A synthetic lubricating oil composition consisting of 10% by volume of the complex ester described in Example II, part B, and 90% by volume of di-2-ethylhexyl sebacate was prepared. This blend was an excellent synthetic lubricant which met the requirements of Government Specification MIL-L-7808 for Aviation Gas Turbine Engine Lubricants as is shown below:

|  | Blend of 10% Complex Ester, 90% Di-2-Ethylhexyl Sebacate | MIL-L-7808 Requirements |
|---|---|---|
| Kin. Vis.: |  |  |
| 210° F., Cs | 3.57 | 3.0 Min. |
| 100° F | 14.25 | 11.0 Min. |
| −40° F | 1,964 |  |
| −65° F | 11,800 | 13,000 Max. |
| Pour Point, °F | <−75 | >−75 |
| Low Temp. Stability at −65° F | Clear, Fluid, Passes. | Must Pass. |

EXAMPLE V

A. PREPARATION OF CONVENTIONAL DIESTER

A diester of a C$_7$ Oxo alcohol and sebacic acid was prepared. The C$_7$ Oxo alcohol in this example was obtained by oxonation of a C$_6$ olefin fraction obtained from the steam cracking of gas oil and containing about 80% of straight chain C$_6$ olefins, 13% of cyclic C$_6$ olefins and 7% of branched chain C$_6$ olefins. The diester was prepared by heating the following ingredients for 3 hours at 185° C. in the presence of 0.5 wt. percent NaHSO$_4$ catalyst and 0.5 wt. percent phenothiazine oxidation inhibitor and 100 g. heptane water entrainer:

|  | Moles | Grams |
|---|---|---|
| C$_7$ Oxo Alcohol [1] | 0.762 | 88.8 |
| Excess Alcohol, 20% |  | 17.8 |
| Sebacic Acid [1] | 0.381 | 77.0 |

[1] Stoichiometric amounts.

The ester product was diluted with 200 cc. of heptane, washed in sodium carbonate and then stripped at 185° C. at 0.14 mm. to give an oily ester product.

B. PREPARATION OF DIESTER OF THIS INVENTION

A diester of C$_7$ Oxo alcohol and a mixture of C$_{10}$ dibasic acids was prepared. The C$_7$ Oxo alcohol was the same as that described in part A of this example. The mixture of C$_{10}$ dibasic acids was the same as that described in Example I, part B. The diester was prepared in the same manner as described above for C$_7$ Oxo sebacate (part A).

C. The diesters prepared as above had the following properties:

|  | Conventional Diester (Part A) | Diester of this Invention (Part B) |
|---|---|---|
| Kin. Vis.: |  |  |
| 210° F., Cs | 3.1 | 2.83 |
| 100° F | 10.93 | 10.78 |
| −40° F | Solid | 1288 |
| −65° F | Solid | 8811 |
| V. I. | 163 | 122 |
| Pour Point, °F | −15 | <−80 |
| D-664 Neut. No | 0.18 | 0.25 |
| Hydroxyl No |  | 0.3 |

It will be noted that the diester prepared in accordance with this invention (part B) had a substantially lower pour point than did the conventional diester (part A), namely <−80° F. compared to −15° F.

What is claimed is:

As a new composition of matter having lubricating properties a complex ester composition of (a) two moles of an isomeric mixture of aliphatic, saturated, primary branched chain C$_8$ alcohols and (b) two moles of an isomeric mixture of C$_{10}$ dibasic acids comprising by weight about 75% of α-ethyl suberic acid, about 15% α,α'-diethyl adipic acid and about 10% sebacic acid and (c)

one mole of tetraethylene glycol typified by the general formula:

$$R_1\text{—OOCR}_2\text{COO—}R_3\text{—OOCR}_4\text{COO—}R_5$$

wherein $R_1$ and $R_5$ are radicals of the alcohol, $R_2$ and $R_4$ are alkyl radicals of dibasic acid and $R_3$ is the radical of the glycol.

References Cited in the file of this patent

UNITED STATES PATENTS

| | | |
|---|---|---|
| 2,499,983 | Beavers | Mar. 7, 1950 |
| 2,499,894 | Beavers et al. | Mar. 7, 1950 |
| 2,570,037 | Smith et al. | Oct. 2, 1951 |
| 2,575,196 | Smith | Nov. 13, 1951 |
| 2,628,974 | Sanderson | Feb. 17, 1953 |

FOREIGN PATENTS

| | | |
|---|---|---|
| 666,697 | Great Britain | Feb. 20, 1952 |

OTHER REFERENCES

Ind. & Eng. Chem. 39, No. 4, pages 484–497, pages 484–487 pertinent.

Ind. & Eng. Chem. 45, No. 8, pages 1766–1775, pages 1769–1773 pertinent.